C. H. HOLDREDGE & C. H. COWAN.
Thill-Coupling.
No. 206,948.　　　　　Patented Aug. 13, 1878.
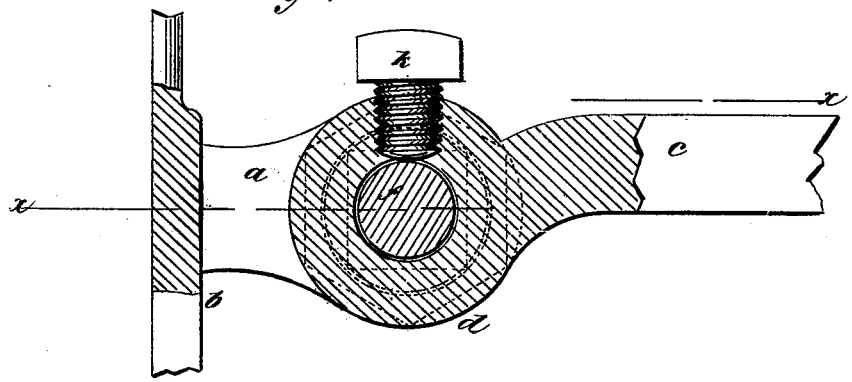
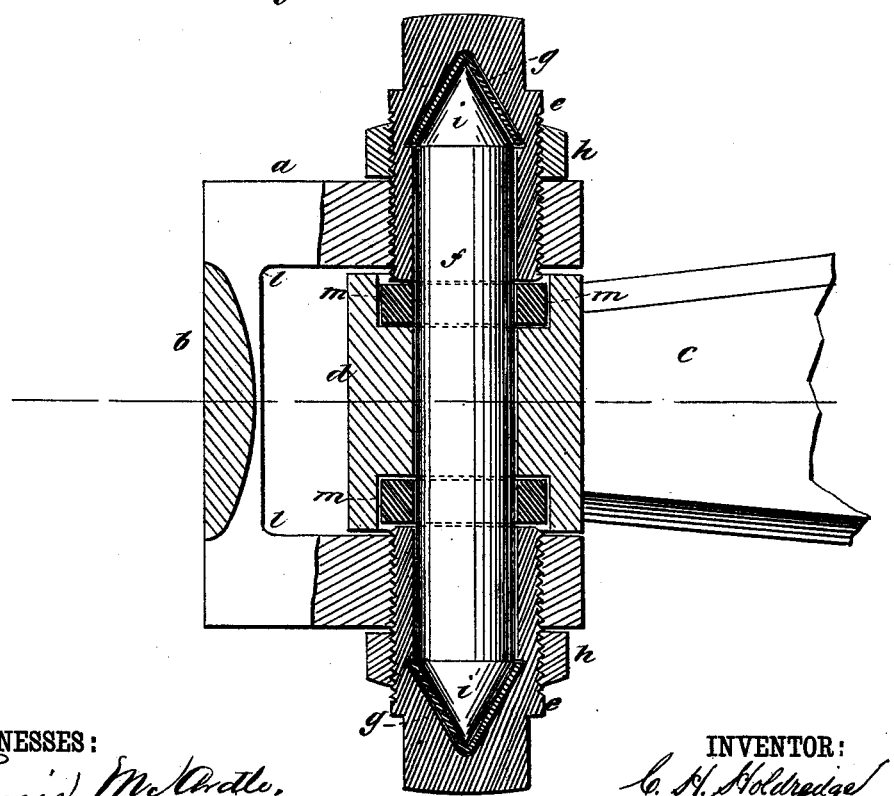
WITNESSES:
Francis McArdle.
C. Sedgwick
INVENTOR:
C. H. Holdredge
C. H. Cowan
BY
ATTORNEYS.

UNITED STATES PATENT OFFICE.

CHARLES H. HOLDREDGE, OF WESTERLY, RHODE ISLAND, AND CHARLES H. COWAN, OF STONINGTON, CONNECTICUT.

IMPROVEMENT IN THILL-COUPLINGS.

Specification forming part of Letters Patent No. 206,948, dated August 13, 1878; application filed July 2, 1878.

*To all whom it may concern:*

Be it known that we, CHARLES H. HOLDREDGE, of Westerly, in the county of Washington and State of Rhode Island, and CHARLES H. COWAN, of Stonington, in the county of New London and State of Connecticut, have invented a new and useful Improvement in Thill-Couplings, of which the following is a specification.

Our invention has for its object to furnish an improved means for connecting the shaft-iron of a carriage with the axle-tree clips, so that they will be firmly connected and wear may be compensated for.

Our invention consists in screw-sockets held in the clips or ears, and forming supports or bearings for a pivot-pin connected with the shaft-iron. The screw-sockets may be adjusted to compensate for wear, and are kept from getting loose by jam-nuts. The pivot-pin is connected to the shaft-iron by a set-screw, to cause the pin and shaft-iron to move together.

In the drawing, Figure 1 is a vertical longitudinal section through the center of my improved thill-coupling, and Fig. 2 is a sectional plan at the line $x$ $x$.

Similar letters of reference indicate corresponding parts.

$a$ $a$ are the clips, formed with the strap $b$, which passes around the axle-tree, (not shown,) as usual. $c$ is the shaft-iron, having an eye, $d$, at its end, which eye $d$ passes between the clips $a$ $a$. $e$ $e$ are screw-plugs screwed into holes in the clips $a$ at each side, the holes in the clips being threaded to permit of the insertion of the plugs $e$. $f$ is the pivot-pin, which passes through the eye $d$ of the shaft-iron, and is long enough to project at each side of the eye through the clips $a$, and the ends of $f$ are received into sockets formed in the screw-plugs $e$ by boring into the plugs lengthwise from the inner ends.

The sockets in the screw-plugs $e$ are of a size to fit upon the ends of $f$ loosely and permit the pin $f$ to turn easily in the plugs, and the sockets are pointed at the bottom to correspond with the pointed ends $i$ of the pin $f$. $g$ is a piece of rawhide forced into the socket of each screw-plug $e$, and rests upon the bottom of the socket, so that when the screw-plugs $e$ are screwed up to support the pin $f$, the rawhide $g$ forms a bearing for the pointed ends of $f$.

The outer ends of the screw plugs or sockets $e$ are squared so that they may be screwed up and set by a wrench; and $h$ is a jam-nut upon the plugs, which may be screwed against the outside of the clips $a$, to hold the screw-plugs $e$ in place and prevent them getting loose.

To retain the oil or grease which may be put upon the pin $f$, we form the hole in the eye $d$ of the shaft-iron slightly larger next to the clips $a$, so as to form an annular chamber around the pin $f$ and force in a ring of leather or rubber, $m$, which will bear upon $f$ and against the inner ends of the screw-plugs $e$. This forms a tight joint, retaining the lubricating material and preventing grit from getting into the bearing.

We prefer to case-harden the pivot-pin $f$, especially at its pointed ends $i$, where the wear mostly will be; but the rawhide $g$ at that point will reduce the wear to a minimum.

The pivot-pin $f$ is intended to turn with the shaft-iron $c$ and eye $d$, and, for connecting them together, we provide a set-screw, $k$, passing through the eye $d$ from the outside and bearing upon the pin $f$.

This form of coupling furnishes a firm and reliable connection for the shafts of a carriage, and the screw-plugs may be set up so that there can be no rattling of the parts, and the smallest amount of wear is readily compensated for.

The strap $b$ and clips $a$ are usually formed in one piece by dies, and the angle between the clips and strap is made square; that point is where the clips generally break off.

To strengthen and re-enforce the angle, we form it with a rounded surface, as seen at $l$ in Fig. 2, thereby giving more metal at that point and strengthening the clips.

We do not limit ourselves to the details of the parts exactly as described, or the manner of connecting the pivot-pin and shaft-iron together, as they may be varied without departing from our invention.

The devices described may be used as a carriage-spring coupling equally as well.

Having thus described our invention, we claim as new and desire to secure by Letters Patent—

The combination of the shaft-iron, having the smooth pivot-pin or bolt $f$ secured thereto, with the adjustable screw-threaded thimbles having sockets for the pivot-pin, and the clip having screw-threaded side ears, as and for the purpose set forth.

CHARLES HENRY HOLDREDGE.
CHARLES HERBERT COWAN.

Witnesses:
  EDGAR A. BURDICK,
  HENRY WHIPPLE.